US011990091B2

(12) United States Patent
Park et al.

(10) Patent No.: US 11,990,091 B2
(45) Date of Patent: May 21, 2024

(54) DISPLAY APPARATUS AND METHOD OF DRIVING THE SAME

(71) Applicant: Samsung Display Co., LTD., Yongin-si (KR)

(72) Inventors: Junhyun Park, Suwon-si (KR); Jangmi Kang, Seoul (KR); Hyeongseok Kim, Hwaseong-si (KR); Soil Yoon, Seoul (KR); Minjae Jeong, Hwaseong-si (KR); Mukyung Jeon, Ulsan (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/085,779

(22) Filed: Dec. 21, 2022

(65) Prior Publication Data

US 2023/0306905 A1 Sep. 28, 2023

(30) Foreign Application Priority Data

Mar. 22, 2022 (KR) ........................ 10-2022-0035447

(51) Int. Cl.
*G09G 3/3233* (2016.01)

(52) U.S. Cl.
CPC ..... *G09G 3/3233* (2013.01); *G09G 2300/043* (2013.01); *G09G 2300/0819* (2013.01); *G09G 2300/0842* (2013.01); *G09G 2300/0861* (2013.01); *G09G 2310/08* (2013.01); *G09G 2320/0214* (2013.01); *G09G 2320/0247* (2013.01); *G09G 2330/021* (2013.01)

(58) Field of Classification Search
None
See application file for complete search history.

(56) References Cited

U.S. PATENT DOCUMENTS

2005/0258466 A1* 11/2005 Kwak ..................... H01L 28/60 257/532
2006/0156118 A1* 7/2006 Shin ..................... G09G 3/3266 714/726

(Continued)

FOREIGN PATENT DOCUMENTS

KR 100698709 3/2007
KR 1020210011553 2/2021

(Continued)

*Primary Examiner* — Dorothy Harris
(74) *Attorney, Agent, or Firm* — CANTOR COLBURN LLP

(57) ABSTRACT

A display apparatus includes a display panel, a gate driver, a data driver and an emission driver. The display panel includes a pixel. The gate driver provides a gate signal to the pixel. The data driver provides a data voltage to the pixel. The emission driver provides an emission signal to the pixel. The pixel includes a light emitting element, a driving switching element which applies a driving current to the light emitting element, a storage capacitor connected to a control electrode of the driving switching element and a bias capacitor including a first electrode connected to the storage capacitor and a second electrode which receives a bias gate signal. A waveform of the bias gate signal varies based on an off ratio representing a ratio of an off period of the emission signal in a frame period.

12 Claims, 13 Drawing Sheets

(56) References Cited

U.S. PATENT DOCUMENTS

| | | | | |
|---|---|---|---|---|
| 2009/0251392 | A1* | 10/2009 | Kim | G09G 3/3266 345/76 |
| 2010/0177024 | A1* | 7/2010 | Choi | G09G 3/3233 345/76 |
| 2011/0157135 | A1* | 6/2011 | Lee | G09G 3/3291 345/76 |
| 2011/0279430 | A1* | 11/2011 | Koh | G09G 3/003 345/76 |
| 2019/0362673 | A1* | 11/2019 | Ueda | H10K 59/131 |
| 2021/0134917 | A1* | 5/2021 | Li | G09G 3/3275 |
| 2021/0287610 | A1* | 9/2021 | Kim | G09G 3/3233 |
| 2022/0270542 | A1* | 8/2022 | Park | G09G 3/32 |
| 2023/0215314 | A1* | 7/2023 | Ke | G09G 3/32 345/443 |

FOREIGN PATENT DOCUMENTS

| | | |
|---|---|---|
| KR | 1020210013509 | 2/2021 |
| KR | 1020210057629 | 5/2021 |

* cited by examiner

DISPLAY APPARATUS AND METHOD OF DRIVING THE SAME

This application claims priority to Korean Patent Application No. 10-2022-0035447, filed on Mar. 22, 2022, and all the benefits accruing therefrom under 35 U.S.C. § 119, the content of which in its entirety is herein incorporated by reference.

BACKGROUND

1. Field

Embodiments of the invention relate to a display apparatus and a method of driving the display apparatus. More particularly, embodiments of the invention relate to a display apparatus with reduced power consumption in a variable frequency driving and a method of driving the display apparatus.

2. Description of the Related Art

Generally, a display apparatus includes a display panel and a display panel driver. The display panel may include a plurality of gate lines, a plurality of data lines, a plurality of emission lines and a plurality of pixels. The display panel driver may include a gate driver, a data driver, an emission driver and a driving controller. The gate driver outputs gate signals to the gate lines. The data driver outputs data voltages to the data lines. The emission driver outputs emission signals to the emission lines. The driving controller controls the gate driver, the data driver and the emission driver.

SUMMARY

In a display apparatus that operates in a low frequency driving and a variable frequency driving, a difference between a luminance in an address scan period and a luminance in a self-scan period may be generated and the luminance difference may be shown to a user as a flicker. To compensate the difference between the luminance in the address scan period and the luminance in the self-scan period, a bias operation in which a bias voltage is applied to a driving switching element may be performed. When the bias operation is not performed properly, the flicker may occur so that a display quality may be deteriorated and a power consumption of the display apparatus may be increased.

Embodiments of the invention provide a display apparatus supporting (or configured to operate in) a low frequency driving and a variable frequency driving and in which a bias operation is properly performed to reduce the power consumption in the variable frequency driving.

Embodiments of the invention also provide a method of driving the display apparatus.

In an embodiment of a display apparatus according to the invention, the display apparatus includes a display panel, a gate driver, a data driver and an emission driver. In such an embodiment, the display panel includes a pixel, the gate driver provides a gate signal to the pixel, the data driver provides a data voltage to the pixel, and the emission driver provides an emission signal to the pixel. In such an embodiment, the pixel includes a light emitting element, a driving switching element which applies a driving current to the light emitting element, a storage capacitor connected to a control electrode of the driving switching element and a bias capacitor including a first electrode connected to the storage capacitor and a second electrode which receives a bias gate signal. In such an embodiment, a waveform of the bias gate signal varies based on an off ratio representing a ratio of an off period of the emission signal in a frame period.

In an embodiment, as the off ratio increases, an amplitude of a pulse of the bias gate signal may decrease.

In an embodiment, when the off ratio is greater than a first reference value, the bias gate signal may maintain a high level without having a pulse.

In an embodiment, the storage capacitor may include a first electrode connected to the control electrode of the driving switching element and a second electrode connected to the first electrode of the bias capacitor.

In an embodiment, the first electrode of the bias capacitor may be connected to the control electrode of the driving switching element.

In an embodiment, the pixel may further include a data voltage applying switching element which applies the data voltage to the storage capacitor and a first leakage compensation switching element connected between the storage capacitor and the data voltage applying switching element.

In an embodiment, the pixel may further include a second leakage compensation switching element including an input electrode connected to the control electrode of the driving switching element and a control electrode connected to a control electrode of the first leakage compensation switching element.

In an embodiment, the driving switching element and the data voltage applying switching element may be P-type transistors, and the first leakage compensation switching element and the second leakage compensation switching element may be N-type transistors.

In an embodiment, the pixel may further include a data initialization switching element which is connected to an output electrode of the second leakage compensation switching element and applies an initialization voltage to the output electrode of the second leakage compensation switching element.

In an embodiment, the pixel may further include a threshold voltage compensation switching element connected between an output electrode of the data initialization switching element and an output electrode of the driving switching element.

In an embodiment, the pixel may further include a light emitting element initialization switching element connected to an anode electrode of the light emitting element, and a control signal applied to a control electrode of the data initialization switching element may be an N-th initialization gate signal and a control signal applied to a control electrode of the light emitting element initialization switching element is an (N+K)-th initialization gate signal, where N is a positive integer, and K is a positive integer.

In an embodiment of a display apparatus according to the invention, the display apparatus includes a display panel, a gate driver, a data driver and an emission driver. In such an embodiment, the display panel includes a pixel, and the gate driver provides a gate signal to the pixel, the data driver provides a data voltage to the pixel, and the emission driver provides an emission signal to the pixel. In such an embodiment, the pixel include a light emitting element, a driving switching element which applies a driving current to the light emitting element, a first bias switching element connected to the driving switching element and including a control electrode which receives a second bias gate signal and an input electrode which receives a bias voltage and a second bias switching element connected to the driving switching element and including a control electrode which receive the emission signal. In such an embodiment, when an off ratio representing a ratio of an off period of the emission signal in a frame period is greater than a first reference value, a waveform of the emission signal in an address scan period, in which the data voltage is applied to the driving switching element and the light emitting element emits a light, is different from a waveform of the emission signal in a self-scan period, in which the data voltage is not applied to the driving switching element and the light emitting element emits a light.

In an embodiment, when the off ratio is less than a second reference value, a low period of the emission signal may have a first width in the address scan period and a low period of the emission signal has the first width in the self-scan period.

In an embodiment, when the off ratio is greater than the first reference value, a low period of the emission signal may have a second width less than the first width in the address scan period and the emission signal may maintain a low level in the self-scan period.

In an embodiment, the pixel may further include an emission switching element connected between the driving switching element and the light emitting element. A second emission signal may be applied to a control electrode of the emission switching element. When the off ratio is greater than the first reference value, a low period of the second emission signal may have the second width in the address scan period and the second emission signal may have the second width in the self-scan period.

In an embodiment, when the off ratio is less than a second reference value, the second bias gate signal may have a low pulse in the address scan period and the second bias gate signal may have a low pulse in the self-scan period.

In an embodiment, when the off ratio is greater than the first reference value, the second bias gate signal may have a low pulse in the address scan period and the second bias gate signal may maintain a high level in the self-scan period.

In an embodiment, the pixel may further include a light emitting element initialization switching element connected to an anode electrode of the light emitting element. A first bias gate signal may be applied to a control electrode of the light emitting element initialization switching element. In such an embodiment, when the off ratio is less than a second reference value, a waveform of the first bias gate signal in the address scan period may be substantially the same as a waveform of the second bias gate signal in the address scan period, and a waveform of the first bias gate signal in the self-scan period may be substantially the same as a waveform of the second bias gate signal in the self-scan period. In such an embodiment, when the off ratio is greater than the first reference value, a waveform of the first bias gate signal in the address scan period may be substantially the same as a waveform of the second bias gate signal in the address scan period and a waveform of the first bias gate signal in the self-scan period may be different from a waveform of the second bias gate signal in the self-scan period.

In an embodiment, when the off ratio is greater than the first reference value, the first bias gate signal may have a low pulse and the second bias gate signal may maintain a high level in the self-scan period.

In an embodiment of a method of driving a display apparatus according to the invention, the method includes providing a gate signal to a pixel of a display panel of the display apparatus, providing a data voltage to the pixel and providing an emission signal to the pixel. In such an embodiment, the pixel includes a light emitting element, a driving switching element which applies a driving current to the light emitting element, a storage capacitor connected to a control electrode of the driving switching element and a bias capacitor including a first electrode connected to the storage capacitor and a second electrode which receives a bias gate signal. In such an embodiment, a waveform of the bias gate signal varies based on an off ratio representing a ratio of an off period of the emission signal in a frame period.

According to embodiments of the display apparatus and the method of driving the display apparatus, the pixel includes a leakage compensation switching element connected to the storage capacitor so that the current leakage may be reduced in the display apparatus supporting the low frequency driving and the variable frequency driving and the flicker may not occur by the luminance difference according to the driving frequency due to the current leakage in the pixel.

In such embodiments, the bias operation in which the bias voltage is applied to the driving switching element may be properly operated to compensate the difference between the luminance in the address scan period and the luminance in the self-scan period in the display apparatus supporting the low frequency driving and the variable frequency driving so that the flicker may be prevented and the power consumption may be reduced.

BRIEF DESCRIPTION OF THE DRAWINGS

The above and other features of embodiments of the invention will become more apparent by describing in detailed embodiments thereof with reference to the accompanying drawings, in which.

DETAILED DESCRIPTION

Figure 1:
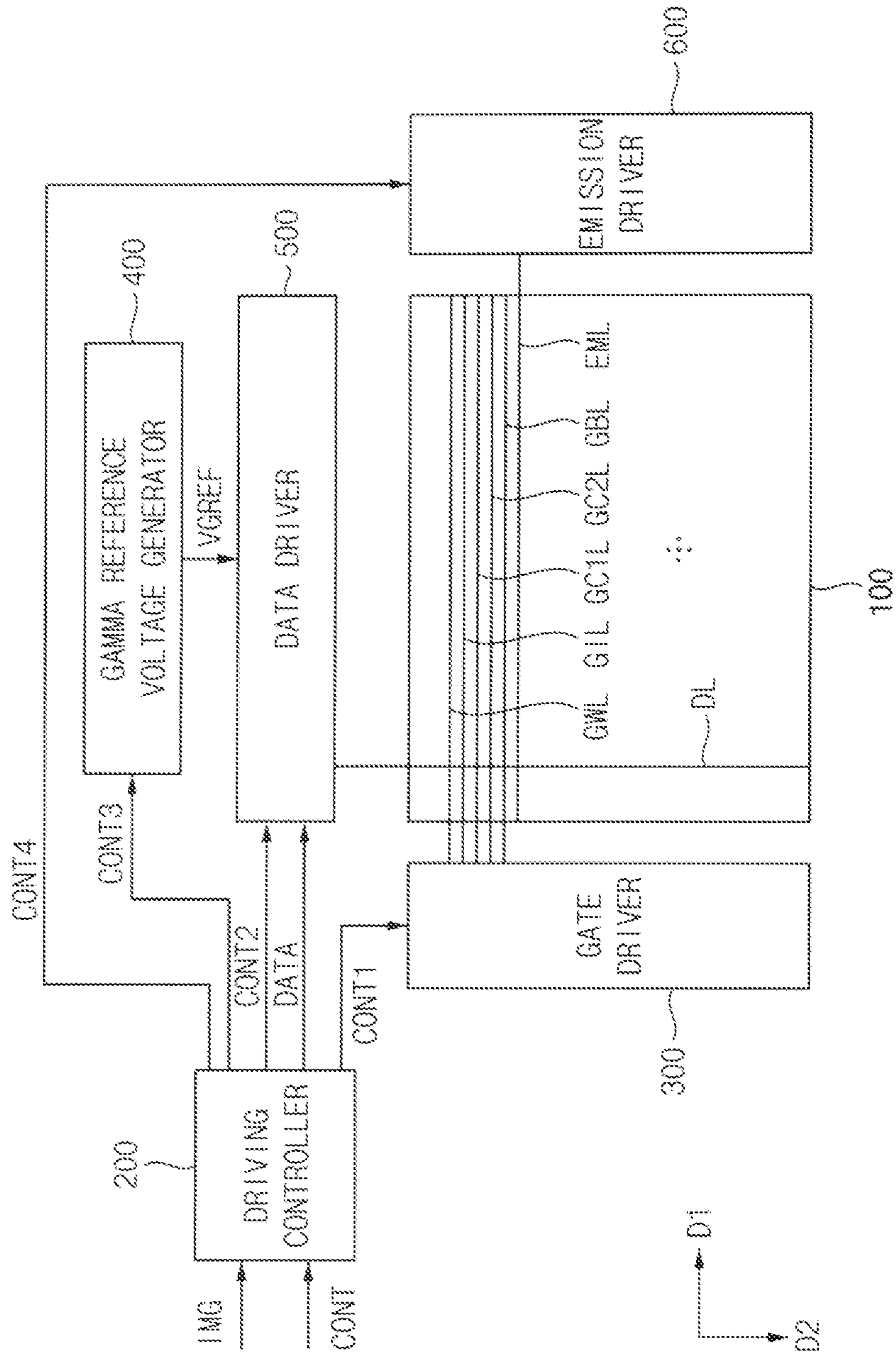
FIG. 1 is a block diagram illustrating a display apparatus according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

FIG. 1 is a block diagram illustrating a display apparatus according to an embodiment of the invention.

Referring to FIG. 1, an embodiment of the display apparatus includes a display panel 100 and a display panel driver. The display panel driver includes a driving controller 200, a gate driver 300, a gamma reference voltage generator 400, a data driver 500 and an emission driver 600.

The display panel 100 includes a display region on which an image is displayed and a peripheral region adjacent to the display region.

The display panel 100 includes a plurality of gate lines GWL, GIL, GC1L, GC2L and GBL, a plurality of data lines DL, a plurality of emission lines EML and a plurality of pixels electrically connected to the gate lines GWL, GIL, GC1L, GC2L and GBL, the data lines DL and the emission lines EML. The gate lines GWL, GIL, GC1L, GC2L and GBL may extend in a first direction D1, the data lines DL may extend in a second direction D2 crossing the first direction D1 and the emission lines EML may extend in the first direction D1.

The driving controller 200 receives input image data IMG and an input control signal CONT from an external apparatus. In an embodiment, for example, the input image data IMG may include red image data, green image data and blue image data. The input image data IMG may further include white image data. Alternatively, the input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 generates the fourth control signal CONT4 for controlling an operation of the emission driver 600 based on the input control signal CONT, and outputs the fourth control signal CONT4 to the emission driver 600.

The gate driver 300 generates gate signals to drive the gate lines GWL, GIL, GC1L, GC2L and GBL in response to the first control signal CONT1 received from the driving controller 200. The gate driver 300 may sequentially output the gate signals to the gate lines GWL, GIL, GC1L, GC2L and GBL.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

The emission driver 600 generates emission signals to drive the emission lines EML in response to the fourth control signal CONT4 received from the driving controller 200. The emission driver 600 may output the emission signals to the emission lines EML.

In an embodiment, as shown in FIG. 1, the gate driver 300 may be disposed at a first side of the display panel 100 and the emission driver 600 may be disposed at a second side of the display panel 100 opposite to the first side, but the invention may not be limited thereto. In an alternative embodiment, for example, both of the gate driver 300 and the emission driver 600 may be disposed at the first side of the display panel 100. In an alternative embodiment, for example, the gate driver 300 and the emission driver 600 may be integrally formed or integrated into a single chip.

Figure 2:
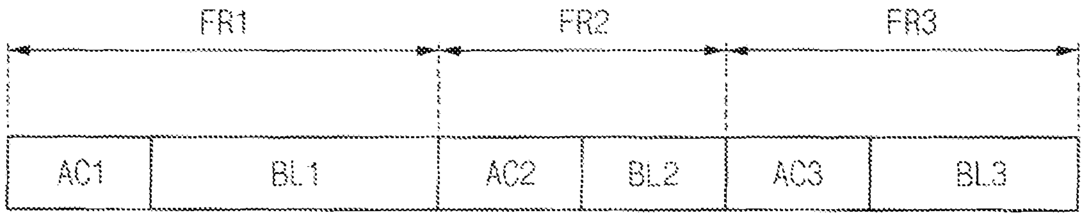
FIG. 2 is a conceptual diagram illustrating a driving frequency of a display panel of FIG. 1.

FIG. 2 is a conceptual diagram illustrating a driving frequency of the display panel 100 of FIG. 1.

Referring to FIGS. 1 and 2, the display panel 100 may be driven in a variable frequency, that is, the driving frequency of the display panel 100 is variable on a frame-by-frame basis. A first frame FR1 corresponding to a first frequency (or when the display panel 100 is driven in the first frequency) may include a first active period AC1 and a first blank period BL1. A second frame FR2 corresponding to a second frequency different from the first frequency may include a second active period AC2 and a second blank period BL2. A third frame FR3 corresponding to a third frequency different from the first frequency and the second frequency may include a third active period AC3 and a third blank period BL3.

The first active period AC1 may have a length substantially the same as a length of the second active period AC2. The first blank period BL1 may have a length different from a length of the second blank period BL2.

The second active period AC2 may have the length substantially the same as a length of the third active period AC3. The second blank period BL2 may have the length different from a length of the third blank period BL3.

The display apparatus supporting the variable frequency driving may include an address scan period in which the data voltage is written to the pixel and a self-scan period in which only light emission is operated without writing the data voltage to the pixel. The address scan period may be disposed (or included) in the active period AC1, AC2 and AC3. The self-scan period may be disposed in the blank period BL1, BL2 and BL3.

Figure 3:
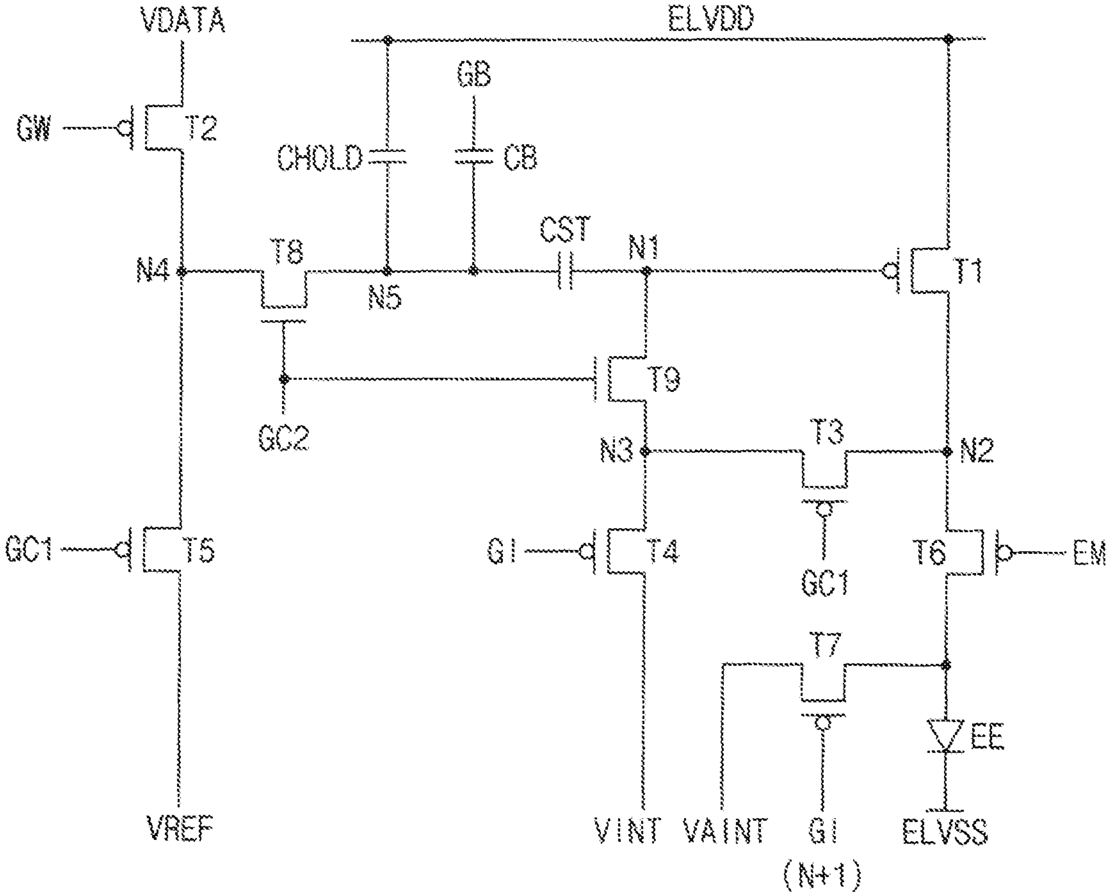
FIG. 3 is a circuit diagram illustrating an embodiment of a pixel of the display panel of FIG. 1.

FIG. 3 is a circuit diagram illustrating an embodiment of a pixel of the display panel 100 of FIG. 1.

Referring to FIGS. 1 to 3, an embodiment of the pixel may include a light emitting element EE, a driving switching element T1 that applies a driving current to the light emitting element EE, a storage capacitor CST connected to a control electrode of the driving switching element T1 and a bias capacitor CB including a first electrode connected to the storage capacitor CST and a second electrode that receives a bias gate signal GB.

In an embodiment of the invention, a waveform of the bias gate signal GB may vary based on an off ratio representing a ratio of an off period of the emission signal EM in a frame period.

In such an embodiment, the storage capacitor CST may include a first electrode connected to the control electrode of the driving switching element T1 and a second electrode connected to the first electrode of the bias capacitor CB.

The pixel may further include a data voltage applying switching element T2 that applies the data voltage VDATA to the storage capacitor CST and a first leakage compensation switching element T8 connected between the storage capacitor CST and the data voltage applying switching element T2.

In an embodiment, for example, the driving switching element T1 and the data voltage applying switching element T2 may be P-type transistors. In such an embodiment, the first leakage compensation switching element T8 may be an N-type transistor. In an embodiment, for example, the driving switching element T1 and the data voltage applying switching element T2 may be low temperature polysilicon (LTPS) thin film transistors. In such an embodiment, the first leakage compensation switching element T8 may be an oxide thin film transistor.

The first leakage compensation switching element T8 may be the N-type transistor such that the current leakage at the first electrode of the storage capacitor CST may be reduced in the low frequency driving. Thus, the level of the data voltage VDATA charged at the storage capacitor CST may not be reduced due to the current leakage in the low frequency driving.

The pixel may further include a second leakage compensation switching element T9 including an input electrode connected to the control electrode of the driving switching element T1 and a control electrode connected to a control electrode of the first leakage compensation switching element T8.

In an embodiment, for example, the second leakage compensation switching element T9 may be an N-type transistor. In an embodiment, for example, the second leakage compensation switching element T9 may be an oxide thin film transistor.

The second leakage compensation switching element T9 may be the N-type transistor such that the current leakage at a second electrode of the storage capacitor CST may be reduced in the low frequency driving. Thus, the level of the data voltage VDATA charged at the storage capacitor CST may not be reduced due to the current leakage in the low frequency driving.

The pixel may further include a data initialization switching element T4 connected to an output electrode of the second leakage compensation switching element T9 and which applies an initialization voltage VINT to the output electrode of the second leakage compensation switching element T9.

The pixel may further include a threshold voltage compensation switching element T3 connected between an output electrode of the data initialization switching element T4 and an output electrode of the driving switching element T1.

The pixel may further include a light emitting element initialization switching element T7 connected to an anode electrode of the light emitting element EE.

In such an embodiment, a control signal applied to a control electrode of the data initialization switching element T4 may be an N-th initialization gate signal GI, a control signal applied to a control electrode of the light emitting element initialization switching element T7 may be an (N+K)-the initialization gate signal GI(N+K). Herein, N is a positive integer and K is a positive integer. In an embodiment, for example, K may be one. The light emitting element initialization switching element T7 and the data initialization switching element T4 may share signals generated by a same gate driving circuit in different timings so that an increase of resolution due to an additional gate driving circuit and an additional gate signal wiring may be effectively prevented.

In such an embodiment, a light emitting element initialization voltage VAINT applied to an input electrode of the light emitting element initialization switching element T7 may be different from the initialization voltage VINT applied to an input electrode of the data initialization switching element T4. In such an embodiment, the accuracy of initialization of the anode electrode of the light emitting element EE and the accuracy of initialization of the driving switching element T1 may be increased by setting the level of the voltage VAINT for initializing the anode electrode of the light emitting element EE and the level of the voltage VINT for initializing the control electrode of the driving switching element T1 to be differently from each other.

The pixel may further include a reference voltage applying switching element T5 connected to an input electrode of the first leakage compensation switching element T8. In an embodiment, the reference voltage applying switching element T5 may be a P-type transistor. In an embodiment, a voltage applied to an input electrode of the reference voltage applying switching element T5 may be a reference voltage VREF.

The pixel may further include an emission switching element T6 connected between the driving switching element T1 and the light emitting element EE. The emission switching element T6 may connect the driving switching element T1 and the light emitting element EE to each other in response to the emission signal EM.

The pixel may further include a hold capacitor CHOLD including a first electrode that receives a first power voltage ELVDD and a second electrode connected to a first electrode of the storage capacitor CST.

Hereinafter, the pixel structure will be described in greater detail. The pixel may include a first transistor T1 including a control electrode connected to a first node N1, an input electrode that receives the first power voltage ELVDD and an output electrode connected to a second node N2, a second transistor T2 including a control electrode that receives a data writing gate signal GW, an input electrode that receives the data voltage VDATA and an output electrode connected to a fourth node N4, a third transistor T3 including a control electrode that receives a first compensation gate signal GC1, an input electrode connected to a third node N3 and an output electrode connected to the second node N2, a fourth transistor T4 including a control electrode that receives an initialization gate signal GI, an input electrode that receives the initialization voltage VINT and an output electrode connected to the third node N3, a fifth transistor T5 including a control electrode that receives the first compensation gate signal GC1, an input electrode that receives the reference voltage VREF and an output electrode connected to the fourth node N4, a sixth transistor T6 including a control electrode that receives the emission signal EM, an input electrode connected to the second node N2 and an output electrode connected to the anode electrode of the light emitting element EE, a seventh transistor T7 including a control electrode that receives an initialization gate signal GI(N+1) of a next stage, an input electrode that receives the light emitting element initialization voltage VAINT and an output electrode connected to the anode electrode of the light emitting element EE, an eighth transistor T8 including a control electrode that receives a second compensation gate signal GC2, an input electrode connected to the fourth node N4 and an output electrode connected to a fifth node N5 and a ninth transistor T9 including a control electrode that receives the second compensation gate signal GC2, an input electrode connected to the first node N1 and an output electrode connected to the third node N3.

In FIG. 3, GI(N+1) may represent an initialization gate signal of a next stage and GI may represent an initialization gate signal of a present stage. Accordingly, GI may be same as GI(N). Other gate signals GW, GC1 and GC2 may mean the gate signals of the present stage. In addition, the emission signal EM may mean the emission signal of the present stage.

The pixel may further include the storage capacitor CST including the first electrode connected to the fifth node N5 and the second electrode connected to the first node N1, the bias capacitor CB including the first electrode connected to the fifth node N5 and the second electrode that receives the bias gate signal GB, the hold capacitor CHOLD including a first electrode that receives the first power voltage ELVDD and a second electrode connected to the fifth node N5 and the light emitting element EE including the anode electrode connected to the output electrode of the sixth transistor T6 and a cathode electrode that receives a second power voltage ELVSS.

The input electrode and the output electrode of the transistors T1 to T8 are arbitrarily named, so that the input electrode and the output electrode of the transistors T1 to T8 may be named inversely.

Figure 4:
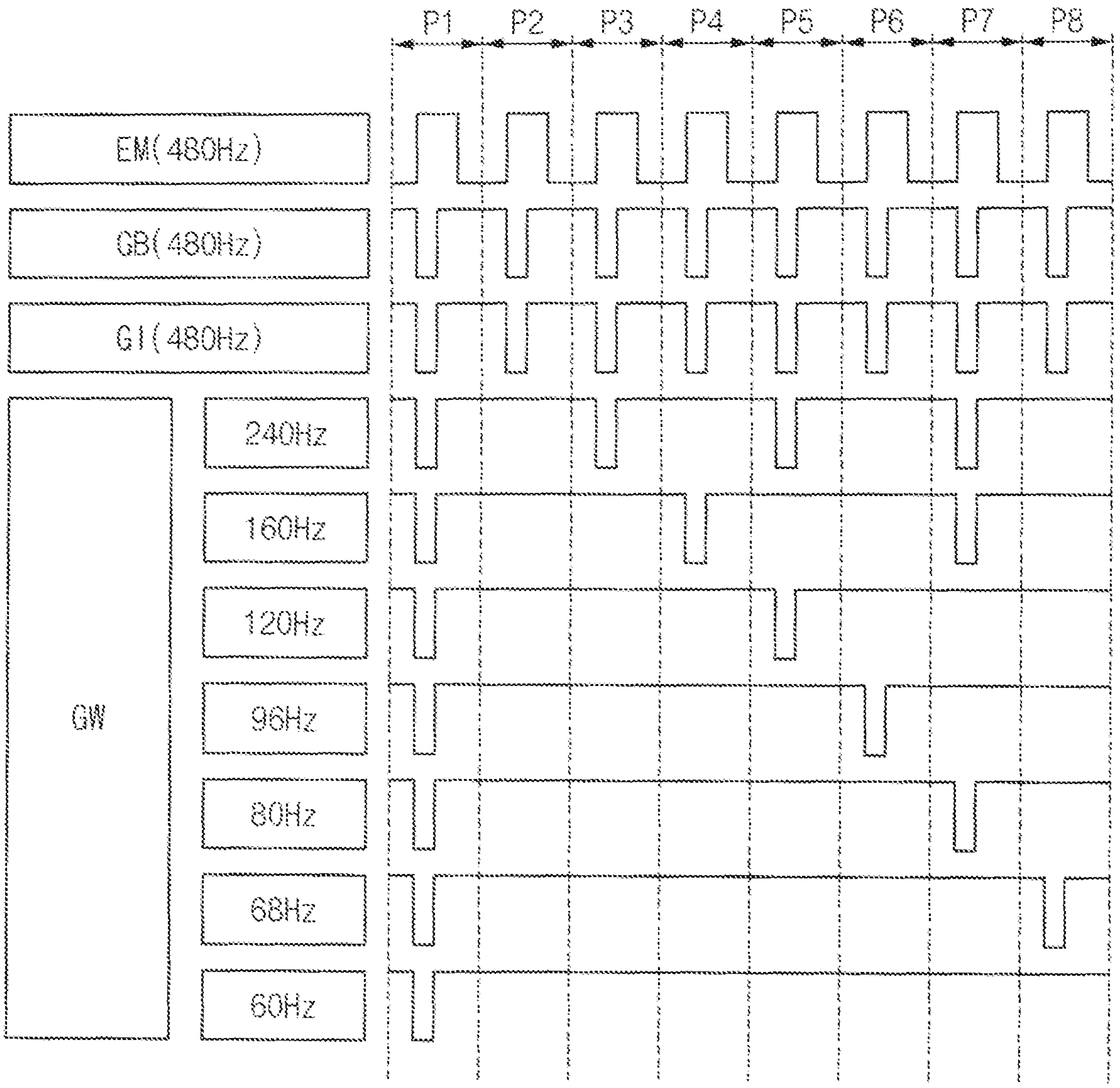
FIG. 4 is a signal timing diagram illustrating driving signals of the pixel of FIG. 3 when a light emitting frequency is 480 Hz.
Figure 5:
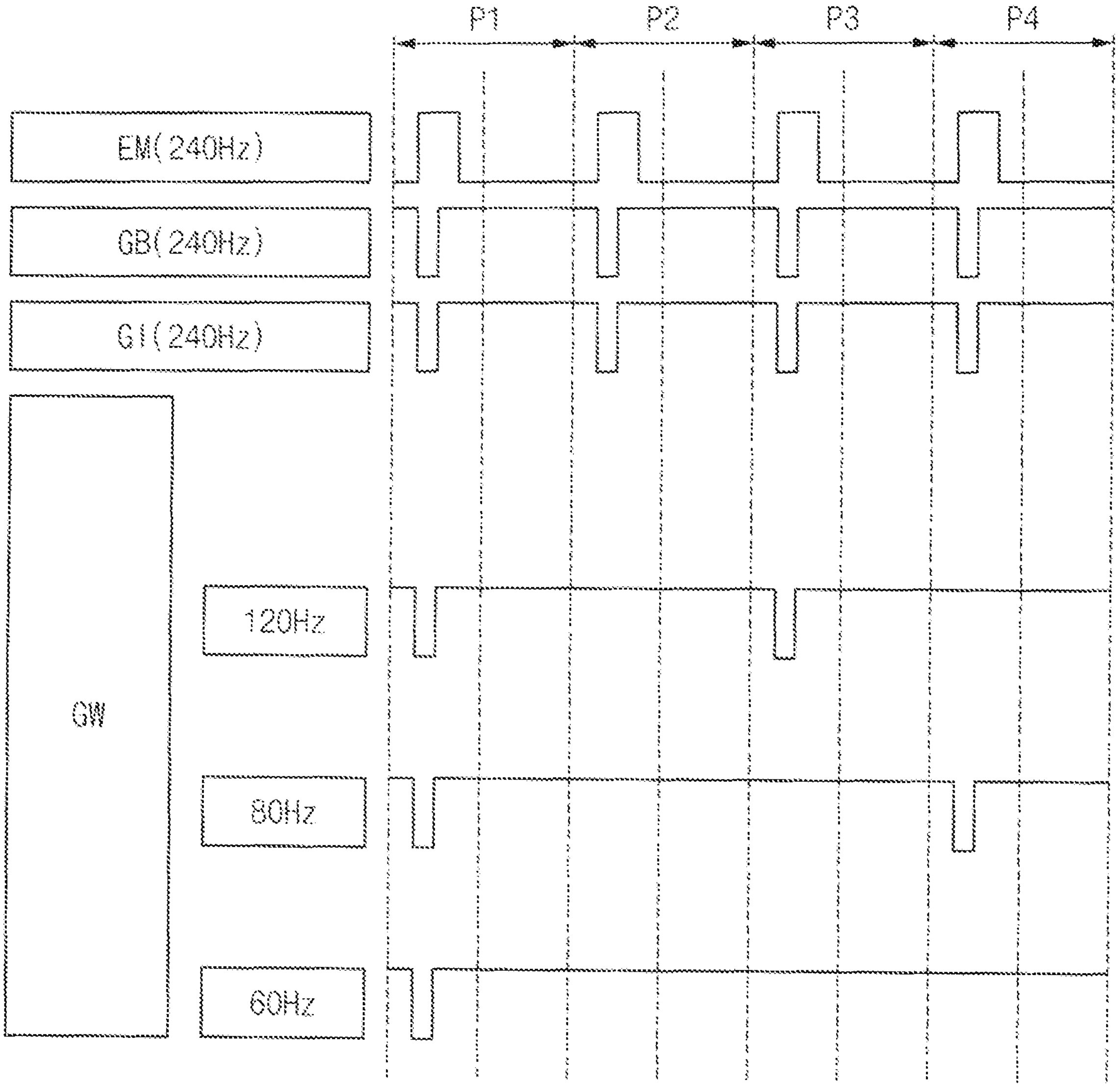
FIG. 5 is a signal timing diagram illustrating driving signals of the pixel of FIG. 3 when the light emitting frequency is 240 Hz.

FIG. 4 is a signal timing diagram illustrating driving signals of the pixel of FIG. 3 when a light emitting frequency is 480 hertz (Hz). FIG. 5 is a signal timing diagram illustrating driving signals of the pixel of FIG. 3 when the light emitting frequency is 240 Hz.

Referring to FIGS. 1 to 5, in the display apparatus supporting the variable frequency driving, the bias operation may be operated (or performed) to the control electrode or the input electrode of the driving switching element T1 of the pixel. In an embodiment, the bias operation may be periodically operated to the control electrode of the driving switching element T1 using the bias capacitor CB and the storage capacitor CST.

In an embodiment, as shown in FIG. 4, the display panel 100 may be driven in varied frequencies. In an embodiment, for example, a maximum driving frequency of the display panel 100 may be 240 Hz. When the display panel 100 is driven in the driving frequency of 240 Hz, the data writing gate signal GW may have active pulses in a first period P1, a third period P3, a fifth period P5 and a seventh period P7 and a data writing operation may be operated in the first period P1, the third period P3, the fifth period P5 and the seventh period P7. When the display panel 100 is driven in the driving frequency of 120 Hz, the data writing gate signal GW may have active pulses in the first period P1 and the fifth period P5 and a data writing operation may be operated in the first period P1 and the fifth period P5.

When the display panel 100 is driven in the driving frequency of 240 Hz, a light emitting operation (EM) of the light emitting element EE may be operated in 480 Hz, an initialization operation (GI) of the light emitting element EE may be operated in 480 Hz and a bias operation (GB) of the driving switching element T1 may be operated in 480 Hz.

When the display panel 100 is driven in 240 Hz and the light emitting operation is driven in 480 Hz as described above, the display panel 100 may be referred to as being operating in two cycles.

When the display panel 100 is driven in the driving frequency of 120 Hz, the light emitting operation (EM) of the light emitting element EE may be operated in 480 Hz, the initialization operation (GI) of the light emitting element EE may be operated in 480 Hz and the bias operation (GB) of the driving switching element T1 may be operated in 480 Hz.

When the display panel 100 is driven in 120 Hz and the light emitting operation is driven in 480 Hz as described above, the display panel 100 may be referred to as being operating in four cycles.

In the display apparatus supporting the variable frequency driving, a driving sequence of the display panel 100 may include an address scan period and a self-scan period. In the address scan period, the data voltage may be written to the pixel. In the self-scan period, the data voltage may not be written to the pixel and only light emission may be operated. In the self-scan period, the data voltage may not be written to the pixel but the light emitting operation (EM) of the light emitting element EE, the initialization operation (GI) of the light emitting element EE and the bias operation (GB) of the driving switching element T1 may be operated. The first period P1 of FIG. 4 is an example of the address scan period and the second period P2 of FIG. 4 is an example of the self-scan period.

In an embodiment, as shown in FIG. 5, the display panel 100 may be driven in varied frequencies. In an embodiment, for example, a maximum driving frequency of the display panel 100 may be 120 Hz. When the display panel 100 is driven in the driving frequency of 120 Hz, the data writing gate signal GW may have active pulses in a first period P1 and a third period P3 and a data writing operation may be operated in the first period P1 and the third period P3. When the display panel 100 is driven in the driving frequency of 800 Hz, the data writing gate signal GW may have active pulses in the first period P1 and a fourth period P4 and a data writing operation may be operated in the first period P1 and the fourth period P4.

Figure 6:
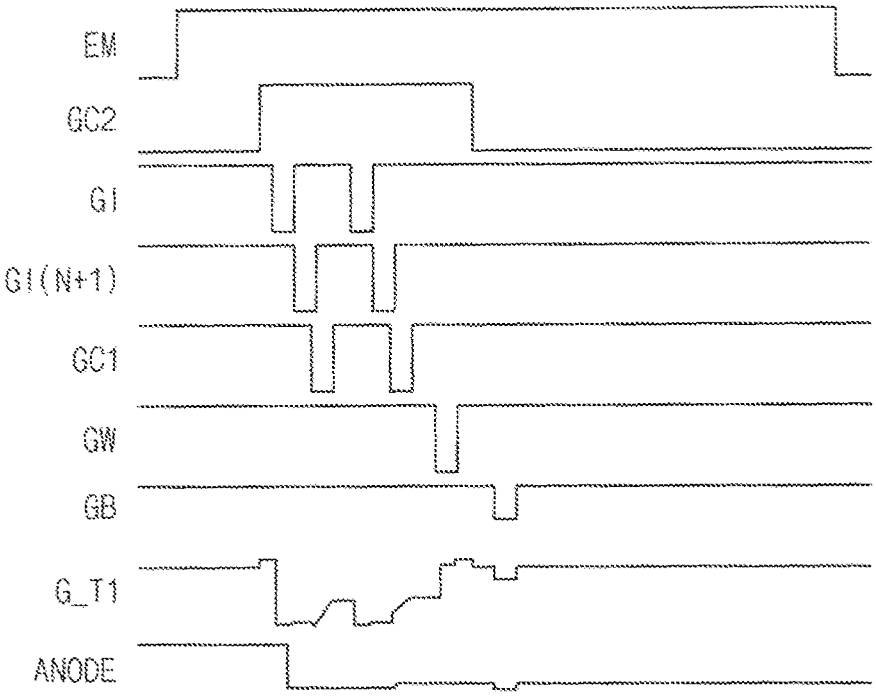
FIG. 6 is a signal timing diagram illustrating an embodiment of input signals applied to the pixel of FIG. 3 and a node signal of the pixel of FIG. 3 in an address scan period.
Figure 7:
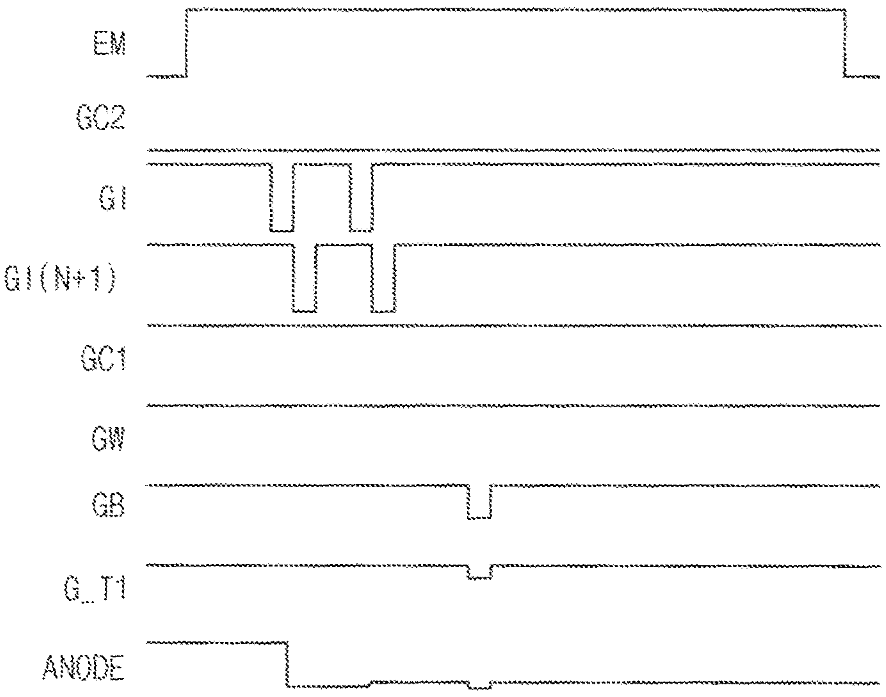
FIG. 7 is a signal timing diagram illustrating an embodiment of input signals applied to the pixel of FIG. 3 and a node signal of the pixel of FIG. 3 in a self-scan period.

FIG. 6 is a signal timing diagram illustrating an embodiment of input signals applied to the pixel of FIG. 3 and a node signal of the pixel of FIG. 3 in the address scan period. FIG. 7 is a signal timing diagram illustrating an embodiment of input signals applied to the pixel of FIG. 3 and a node signal of the pixel of FIG. 3 in the self-scan period.

In an embodiment, as shown in FIGS. 3 and 6, when the emission signal EM has a high level, the sixth transistor T6 may be turned off and accordingly, the light emitting element EE may not emit the light. In such an embodiment, when the emission signal EM is changed to a low level, the sixth transistor T6 may be turned on and accordingly, the light emitting element EE may emit the light.

The second compensation gate signal GC2 is applied to the control electrode of the eighth transistor T8 and the control electrode of the ninth transistor T9. When the second compensation gate signal GC2 has a high level, the eighth transistor T8 and the ninth transistor T9 may be turned on.

The initialization gate signal GI is applied to the control electrode of the fourth transistor T4. When the initialization gate signal GI has a low level, the fourth transistor T4 may be turned on and the initialization voltage VINT may be applied to the control electrode of the first transistor T1 through the fourth transistor T4 and the ninth transistor T9.

The initialization gate signal GI(N+1) of the next stage is applied to the control electrode of the seventh transistor T7. When the initialization gate signal GI(N+1) of the next stage has a low level, the seventh transistor T7 may be turned on and accordingly, the light emitting element initialization voltage VAINT may be applied to the anode electrode of the light emitting element EE through the seventh transistor T7.

The first compensation gate signal GC1 is applied to the control electrode of the third transistor T3 and the control electrode of the fifth transistor T5. When the first compensation gate signal GC1 has a low level, the third transistor T3 may be turned on and accordingly, a threshold voltage of the first transistor T1 may be compensated through the third transistor T3 and the ninth transistor T9. When the first compensation gate signal GC1 has the low level, the fifth transistor T5 may be turned on and accordingly, the reference voltage VREF may be applied to the fifth node N5 through the fifth transistor T5 and the eighth transistor T8.

The data writing gate signal GW is applied to the control electrode of the second transistor T2. When the data writing gate signal GW has a low level, the second transistor T2 may be turned on and accordingly, the data voltage VDATA may be applied to the fifth node N5 through the second transistor T2 and the eighth transistor T8.

In an embodiment, the bias gate signal GB may be applied to the second electrode of the bias capacitor CB. When the bias gate signal GB is applied to the second electrode of the bias capacitor CB, the bias operation may be operated to the control electrode of the driving switching element T1.

A degree of the bias of the driving switching element T1 is determined based on the level of the bias gate signal GB so that the low level of the bias gate signal GB may not be the same as the low level of the data writing gate signal GW. In an embodiment, for example, the low level of the bias gate signal GB may be greater than the low level of the data writing gate signal GW which is applied to the control electrode of the data voltage writing switching element T2.

In such an embodiment, the low level of the data writing gate signal GW, the low level of the first compensation gate signal GC1 and the low level of the initialization gate signal GI may be substantially the same as one another.

In FIG. 6, G T1 may represent a voltage level of the control electrode of the driving switching element T1 and ANODE may represent a voltage level of the anode electrode of the light emitting element EE.

In an embodiment, as shown in FIG. 6, the initialization gate signal GI and the first compensation gate signal GC1 have two low pulses so that the data initialization operation, the light emitting element initialization operation and the compensation operation of the threshold voltage of the driving switching element T1 may be operated twice. In such an embodiment, as described above, the initialization gate signal GI and the first compensation gate signal GC1 have two low pulses in FIG. 6, but the invention may not be limited thereto. Alternatively, the initialization gate signal GI and the first compensation gate signal GC1 may have one low pulse or three or more low pulses.

FIG. 7 represents the self-scan period so that the first compensation gate signal GC1, the second compensation gate signal GC2 and the data writing gate signal GW may have inactive level during the self-scan period. In an embodiment, for example, the inactive level of the first compensation gate signal GC1 and the data writing gate signal GW may be a high level and the inactive level of the second compensation gate signal GC2 may be a low level.

The initialization gate signal GI and the initialization gate signal GI(N+1) of the next stage may have active pulses in the self-scan period. When the initialization gate signal GI(N+1) of the next stage has the active pulse, the seventh transistor T7 may be turned on and accordingly, the light emitting element initialization voltage VAINT may be applied to the anode electrode of the light emitting element EE through the seventh transistor T7.

Even though the initialization gate signal GI has the active pulse, the second compensation gate signal GC2 has the inactive level in the self-scan period. Thus, even when the fourth transistor T4 is turned on, the initialization voltage VINT is not applied to the first node N1 in the self-scan period since the ninth transistor T9 is turned off.

In an embodiment, the bias gate signal GB is applied to the second electrode of the bias capacitor CB. When the bias gate signal GB is applied to the second electrode of the bias capacitor CB, the bias operation may be operated to the control electrode of the driving switching element T1.

Figure 8:
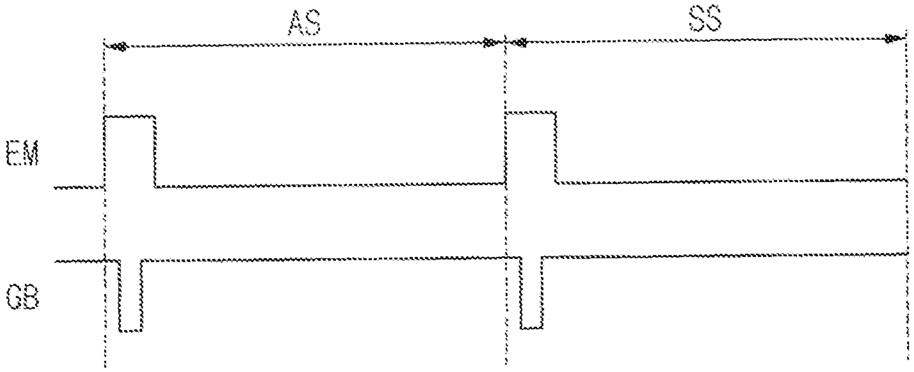
FIG. 8 is a signal timing diagram illustrating an emission signal and a bias gate signal applied to the pixel of FIG. 3 when an off ratio is relatively little.
Figure 9:
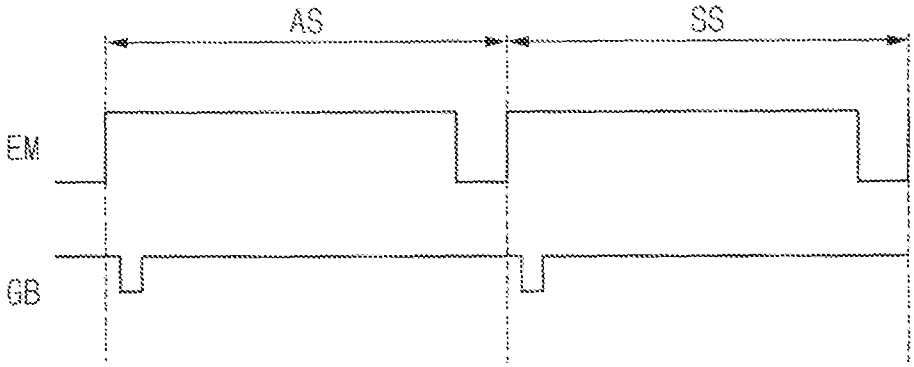
FIG. 9 is a signal timing diagram illustrating the emission signal and the bias gate signal applied to the pixel of FIG. 3 when the off ratio is relatively great.

FIG. 8 is a signal timing diagram illustrating the emission signal EM and the bias gate signal GB applied to the pixel of FIG. 3 when an off ratio is relatively little. FIG. 9 is a signal timing diagram illustrating the emission signal EM and the bias gate signal GB applied to the pixel of FIG. 3 when the off ratio is relatively great.

Referring to FIGS. 1 to 9, the driving controller 200 may determine a luminance based on a user luminance setting and a grayscale value of the input image data. The driving controller 200 may determine AOR (the off ratio) which is a ratio of turned-off gate lines among all gate lines according to the luminance. Herein, AOR may be an abbreviation for active matrix organic light emitting diode (AMOLED) off ratio. The off ratio may also mean a ratio of the off period of the emission signal EM in the frame period. A great off ratio may mean that the user luminance setting is low. When the off ratio is great, the luminance of the display panel 100 may be low. A little off ratio may mean that the user luminance setting is high. When the off ratio is little, the luminance of the display panel 100 may be high.

In FIGS. 8 and 9, AS represents the address scan period and SS represents the self-scan period.

In FIG. 8, a width of a high level indicating that the emission signal EM is off is little and a width of a low level indicating that the emission signal EM is on is great. Thus, FIG. 8 represents a case in which AOR is little (and the user luminance setting is high).

In FIG. 9, the width of the high level indicating that the emission signal EM is off is great and the width of the low level indicating that the emission signal EM is on is little. Thus, FIG. 9 represents a case in which AOR is great (and the user luminance setting is low).

In an embodiment, the waveform of the bias gate signal GB may vary based on (or be variable or changed to correspond to) the off ratio representing the ratio of the off period of the emission signal in the frame period.

As shown in FIGS. 8 and 9, as the off ratio increases, an amplitude of a pulse of the bias gate signal GB may decrease. In an embodiment, when the off ratio is relatively little, the degree of the bias operation may be great so that the amplitude of the pulse of the bias gate signal GB may be relatively great. In such an embodiment, when the off ratio is relatively great, the degree of the bias operation may be little so that the amplitude of the pulse of the bias gate signal GB may be relatively little.

Figure 10:
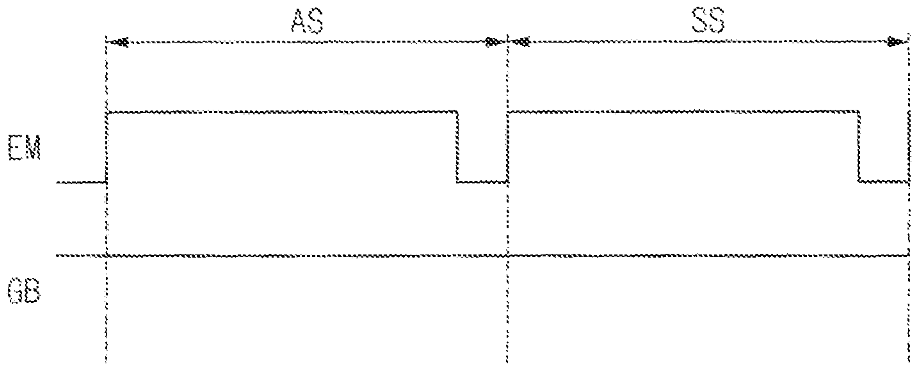
FIG. 10 is a signal timing diagram illustrating the emission signal and the bias gate signal applied to the pixel of FIG. 3 when the off ratio is relatively great.

FIG. 10 is a signal timing diagram illustrating the emission signal and the bias gate signal applied to the pixel of FIG. 3 when the off ratio is relatively great.

When the off ratio is greater than a first reference value in FIG. 10, the bias gate signal GB may not have a pulse but maintain the high level. As shown in FIG. 3, the first power voltage ELVDD is applied to the input electrode of the driving switching element T1. Thus, when the degree of the bias corresponding to the first power voltage ELVDD is desired, the gate signal GB may maintain the high level without having the pulse.

Figure 11:
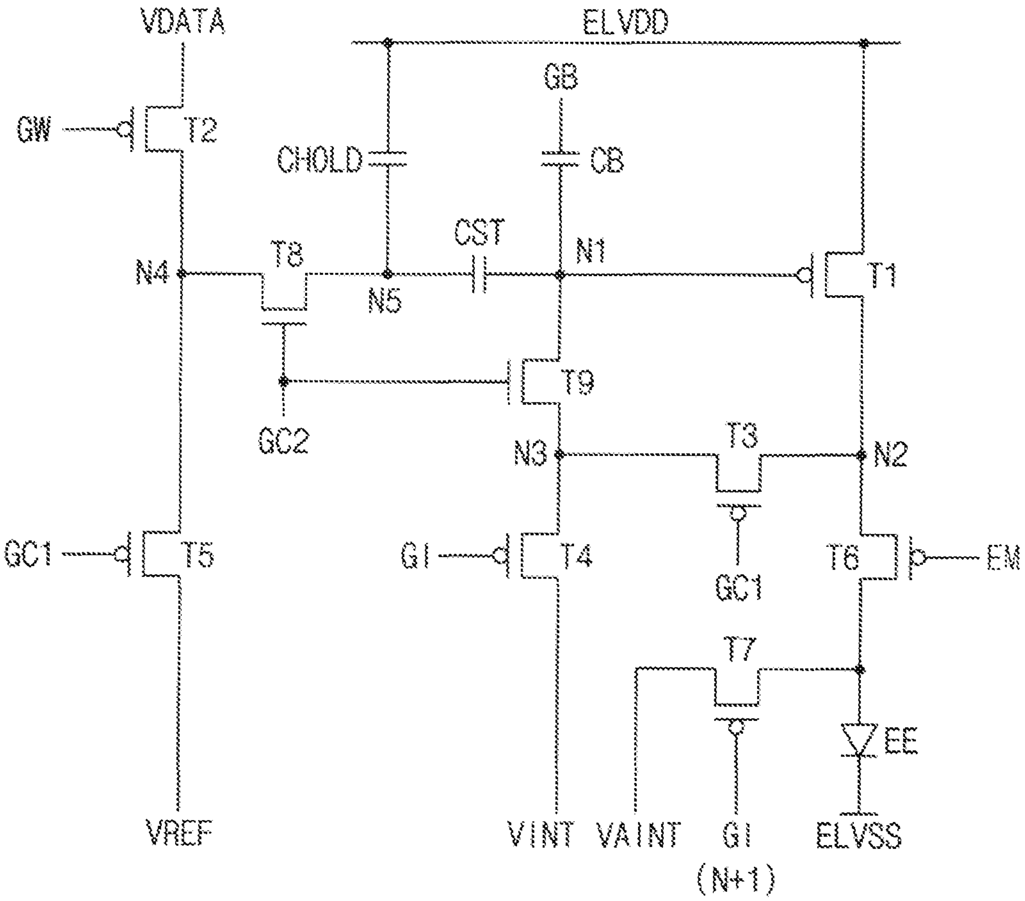
FIG. 11 is a circuit diagram illustrating an embodiment of a pixel of the display panel of FIG. 1.

FIG. 11 is a circuit diagram illustrating an embodiment of a pixel of the display panel 100 of FIG. 1.

An embodiment of the pixel shown in FIG. 11 is substantially the same as the embodiment described above with reference to FIG. 3 except for a position where the bias capacitor is connected. Thus, the same reference numerals will be used to refer to the same or like parts as those described above, and any repetitive detailed description thereof will be omitted or simplified.

Referring to FIG. 11, an embodiment of the pixel may include a light emitting element EE, a driving switching element T1 that applies a driving current to the light emitting element EE, a storage capacitor CST connected to a control electrode of the driving switching element T1 and a bias capacitor CB including a first electrode connected to the storage capacitor CST and a second electrode that receives a bias gate signal GB.

In an embodiment of the invention, as described above, a waveform of the bias gate signal GB may vary based on an off ratio representing a ratio of an off period of the emission signal EM in a frame period.

In such an embodiment, the first electrode of the bias capacitor CB may be directly connected to the first node N1 or the control electrode of the driving switching element T1.

Figure 12:
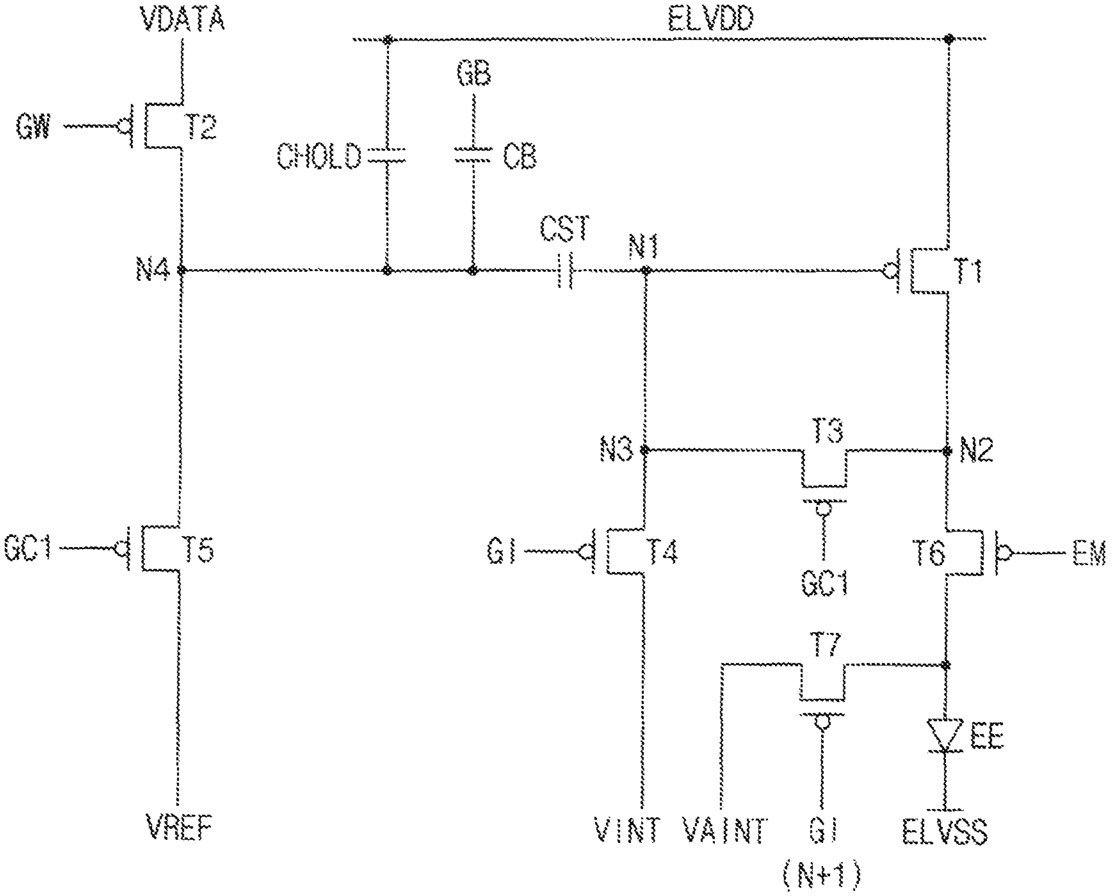
FIG. 12 is a circuit diagram illustrating an embodiment of a pixel of the display panel of FIG. 1.

FIG. 12 is a circuit diagram illustrating an embodiment of a pixel of the display panel 100 of FIG. 1.

An embodiment of the pixel shown in FIG. 12 is substantially the same as the embodiment described above with reference to FIG. 3 except that the pixel does not include the first leakage compensation switching element (the eighth transistor) and the second leakage compensation switching element (the ninth transistor). Thus, the same reference numerals will be used to refer to the same or like parts as those described above, and any repetitive detailed description thereof will be omitted or simplified.

Referring to FIG. 12, an embodiment of the pixel may include a light emitting element EE, a driving switching element T1 that applies a driving current to the light emitting element EE, a storage capacitor CST connected to a control electrode of the driving switching element T1 and a bias capacitor CB including a first electrode connected to the storage capacitor CST and a second electrode that receives a bias gate signal GB.

In an embodiment of the invention, as described above, a waveform of the bias gate signal GB may vary based on an off ratio representing a ratio of an off period of the emission signal EM in a frame period.

In an embodiment, the storage capacitor CST may include a first electrode connected to a control electrode of the driving switching element T1 and a second electrode connected to the first electrode of the bias capacitor CB.

Figure 13:
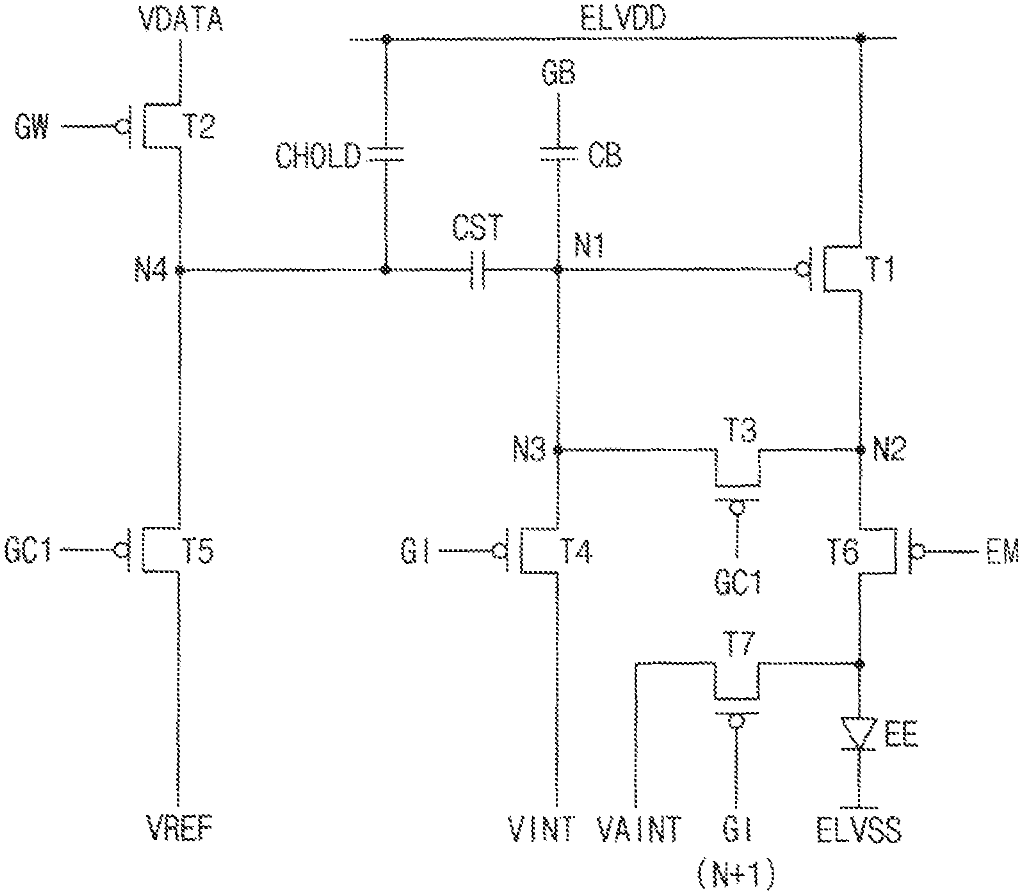
FIG. 13 is a circuit diagram illustrating an embodiment of a pixel of the display panel of FIG. 1.

FIG. 13 is a circuit diagram illustrating an embodiment of a pixel of the display panel of FIG. 1.

An embodiment of the pixel shown in FIG. 13 is substantially the same as the embodiment described above with reference to FIG. 11 except that the pixel does not include the first leakage compensation switching element (the eighth transistor) and the second leakage compensation switching element (the ninth transistor). Thus, the same reference numerals will be used to refer to the same or like parts as those described above, and any repetitive detailed description thereof will be omitted or simplified.

Referring to FIG. 13, an embodiment of the pixel may include a light emitting element EE, a driving switching element T1 that applies a driving current to the light emitting element EE, a storage capacitor CST connected to a control electrode of the driving switching element T1 and a bias capacitor CB including a first electrode connected to the storage capacitor CST and a second electrode that receives a bias gate signal GB.

In an embodiment of the invention, as described above, a waveform of the bias gate signal GB may vary based on an off ratio representing a ratio of an off period of the emission signal EM in a frame period.

In an embodiment, the first electrode of the bias capacitor CB may be directly connected to the first node N1 or the control electrode of the driving switching element T1.

Figure 14:
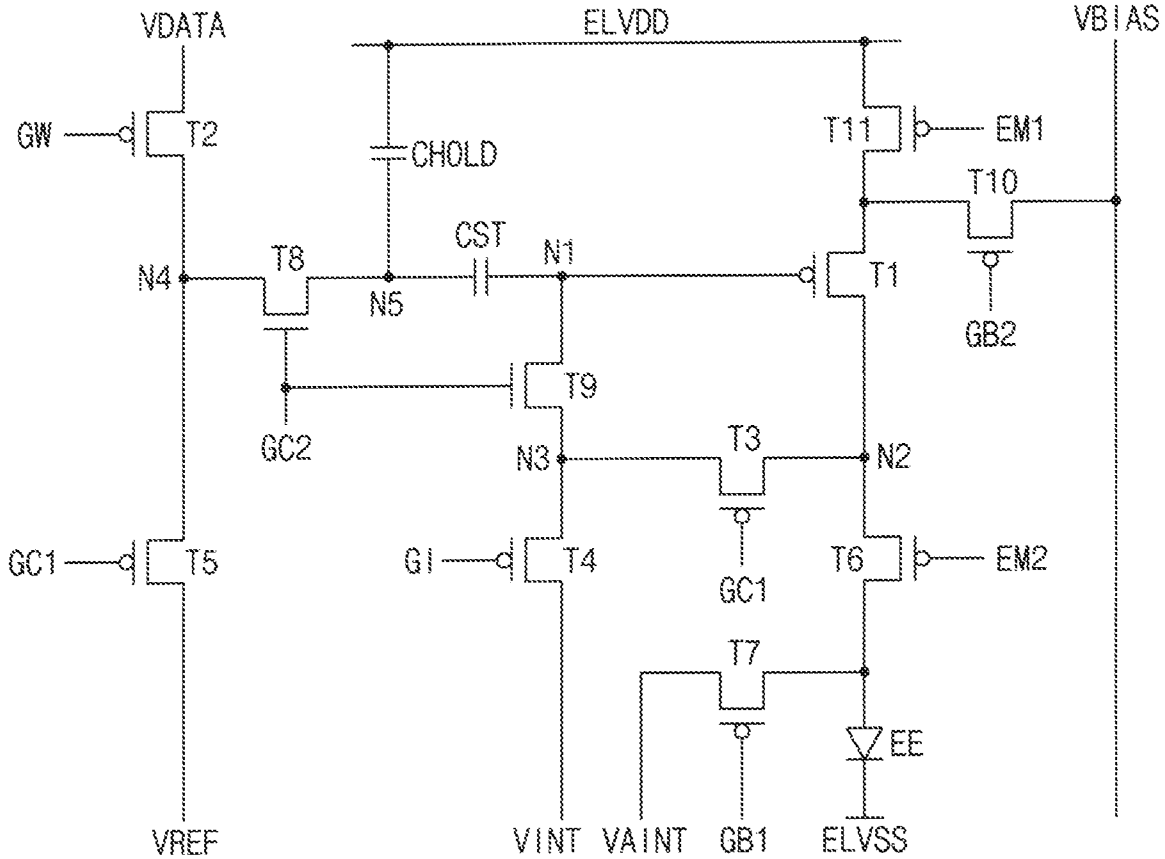
FIG. 14 is a circuit diagram illustrating an embodiment of a pixel of the display panel of FIG. 1.
Figure 15:
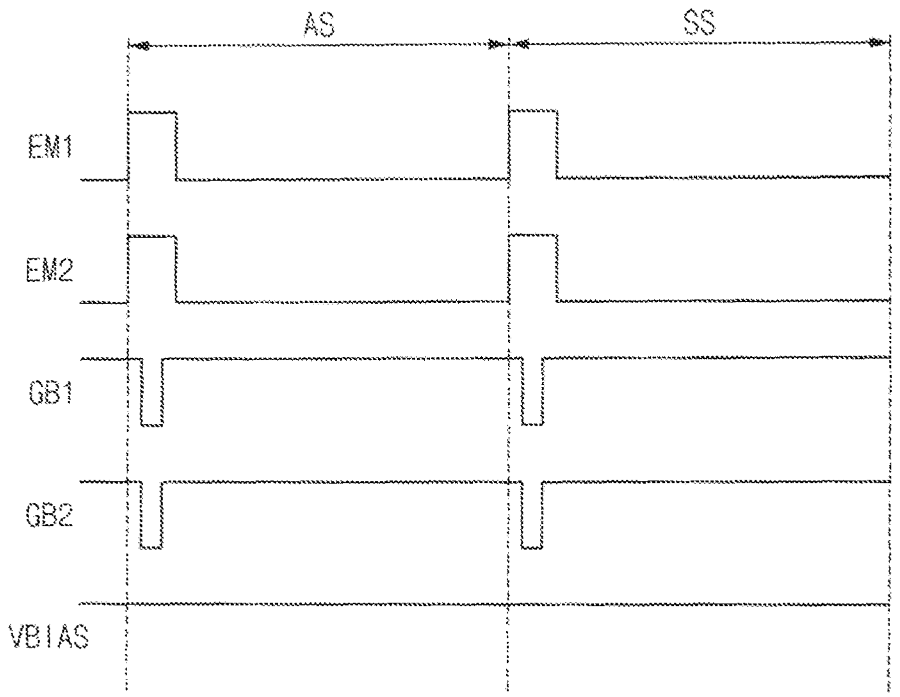
FIG. 15 is a signal timing diagram illustrating an emission signal and a bias gate signal applied to the pixel of FIG. 14 when an off ratio is relatively little.
Figure 16:
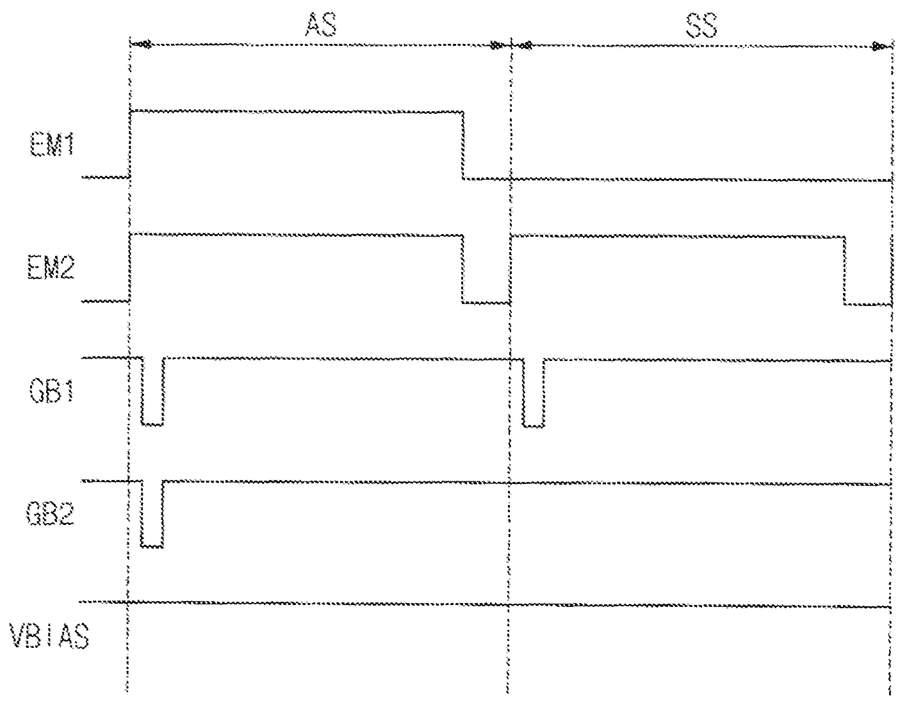
FIG. 16 is a signal timing diagram illustrating the emission signal and the bias gate signal applied to the pixel of FIG. 14 when the off ratio is relatively great.

FIG. 14 is a circuit diagram illustrating an embodiment of a pixel of the display panel of FIG. 1. FIG. 15 is a signal timing diagram illustrating the emission signal EM and the bias gate signal GB applied to the pixel of FIG. 14 when an off ratio is relatively little. FIG. 16 is a signal timing diagram illustrating the emission signal EM and the bias gate signal GB applied to the pixel of FIG. 14 when the off ratio is relatively great.

An embodiment of the pixel shown in FIG. 14 is substantially the same as the embodiment described above with reference to FIG. 3 except that the pixel further includes a first bias switching element and a second bias switching element but does not include a bias capacitor CB. Thus, the same reference numerals will be used to refer to the same or like parts as those described above, and any repetitive detailed description thereof will be omitted or simplified.

Referring to FIGS. 14 to 16, an embodiment of the pixel may include a light emitting element EE, a driving switching element T1 that applies a driving current to the light emitting element EE, a first bias switching element T10 connected to the driving switching element T1 and including a control electrode that receives a second bias gate signal GB2 and an input electrode that receives a bias voltage VBIAS and a second bias switching element T11 connected to the driving switching element T1 and including a control electrode that receives an emission signal EM1.

In FIGS. 15 and 16, AS represents the address scan period and SS represents the self-scan period.

In an embodiment, when the off ratio representing the ratio of the off period of the emission signal (EM1 and/or EM2) in the frame period is greater than a first reference value (e.g. FIG. 16), a waveform of the emission signal EM1 in an address scan period AS, in which the data voltage VDATA is applied to the driving switching element T1 and the light emitting element EE emits a light, may be different from a waveform of the emission signal EM1 in a self-scan period SS, in which the data voltage VDATA is not applied to the driving switching element T1 and the light emitting element EE emits a light.

In an embodiment, for example, when the off ratio is less than a second reference value (e.g., FIG. 15), a low period of the emission signal EM1 may have a first width in the address scan period AS and a low period of the emission signal EM1 may have the first width in the self-scan period SS.

In an embodiment, for example, when the off ratio is greater than the first reference value (e.g., FIG. 16), a low period of the emission signal EM1 may have a second width less than the first width in the address scan period AS and the emission signal EM1 may maintain the low level in the self-scan period SS.

The pixel may further include an emission switching element T6 connected between the driving switching element T1 and the light emitting element EE. A second emission signal EM2 may be applied to a control electrode of the emission switching element T6.

In an embodiment, for example, when the off ratio is greater than the first reference value (e.g., FIG. 16), a low period of the second emission signal EM2 may have the second width in the address scan period AS and the second emission signal EM2 may have the second width in the self-scan period SS.

In an embodiment, for example, when the off ratio is less than the second reference value (e.g., FIG. 15), the second bias gate signal GB2 may have a low pulse in the address scan period AS and the second bias gate signal GB2 may have a low pulse in the self-scan period SS.

In such an embodiment, for example, when the off ratio is greater than the first reference value (e.g., FIG. 16), the second bias gate signal GB2 may have a low pulse in the address scan period AS and the second bias gate signal GB2 may maintain a high level in the self-scan period SS.

The pixel may further include a light emitting element initialization switching element T7 connected to an anode electrode of the light emitting element EE. A first bias gate signal GB1 may be applied to a control electrode of the light emitting element initialization switching element T7.

In an embodiment, for example, when the off ratio is less than the second reference value (e.g. FIG. 15), a waveform of the first bias gate signal GB1 may be substantially the same as a waveform of the second bias gate signal GB2 in the address scan period AS, and a waveform of the first bias gate signal GB1 may be substantially the same as a waveform of the second bias gate signal GB2 in the self-scan period SS.

In such an embodiment, for example, when the off ratio is greater than the first reference value (e.g. FIG. 16), a waveform of the first bias gate signal GB1 may be substantially the same as a waveform of the second bias gate signal GB2 in the address scan period AS, and a waveform of the first bias gate signal GB1 may be different from a waveform of the second bias gate signal GB2 in the self-scan period SS.

When the off ratio is greater than the first reference value (e.g., FIG. 16), the first bias gate signal GB1 may have a low pulse but the second bias gate signal GB2 may maintain a high level in the self-scan period SS.

When the off ratio is greater than a predetermined value, a bias operation may be operated in a way such that EM1 maintains a low level and GB2 maintains a high level, so that the power consumption may be reduced.

Figure 17:
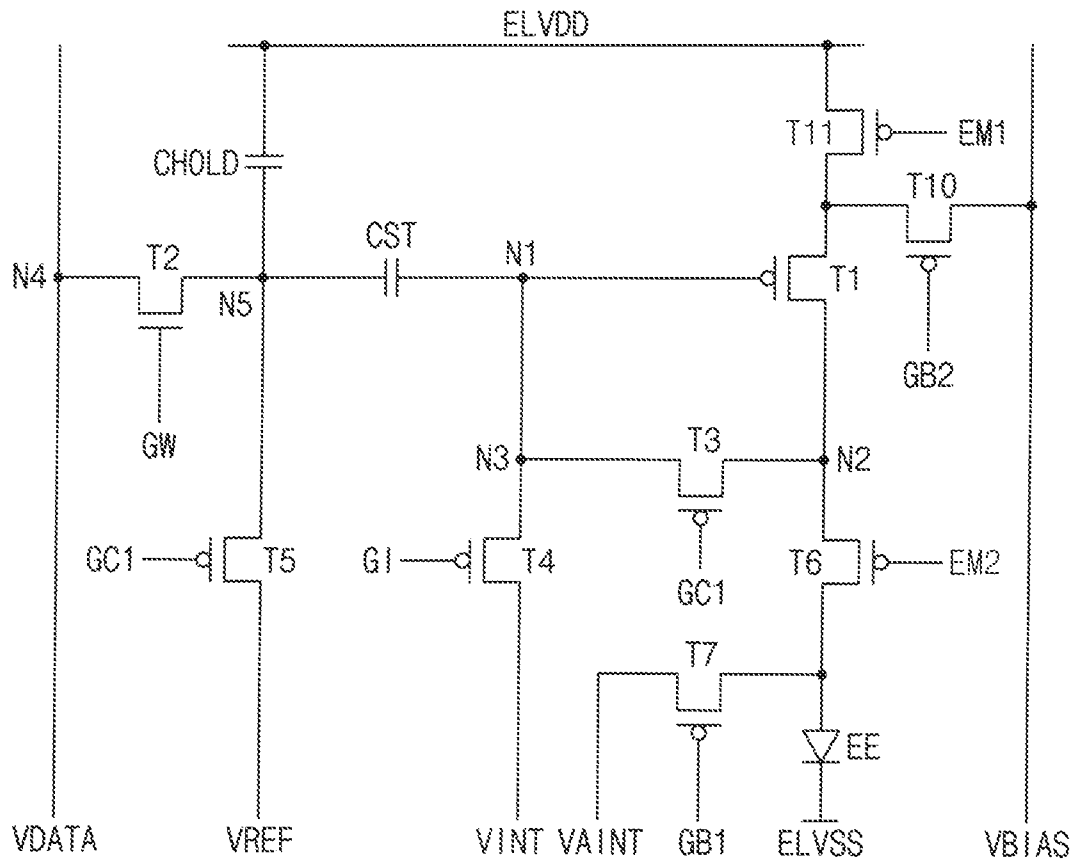
FIG. 17 is a circuit diagram illustrating an embodiment of a pixel of the display panel of FIG. 1.

FIG. 17 is a circuit diagram illustrating an embodiment of a pixel of the display panel 100 of FIG. 1.

An embodiment of the pixel shown in FIG. 17 is substantially the same as the embodiment described above with reference to FIG. 14 except that the pixel does not include the first leakage compensation switching element (the eighth transistor) and the second leakage compensation switching element (the ninth transistor). Thus, the same reference numerals will be used to refer to the same or like parts as those described above, and any repetitive detailed description thereof will be omitted or simplified.

The method of driving the pixel of the pixel of FIG. 17 may be substantially the same as the method of driving the pixel described above FIGS. 15 and 16.

According to embodiments of the display apparatus and the method of driving the display apparatus, the pixel includes the leakage compensation switching element T8 and T9 connected to the storage capacitor CST so that the current leakage may be reduced in the display apparatus supporting the low frequency driving and the variable frequency driving and the flicker may not occur by the luminance difference according to the driving frequency due to the current leakage in the pixel.

In such embodiments, the bias operation in which the bias voltage is applied to the driving switching element T1 may be properly operated to compensate the difference between the luminance in the address scan period AS and the luminance in the self-scan period SS in the display apparatus supporting the low frequency driving and the variable frequency driving so that the flicker may be effectively prevented and the power consumption may be reduced.

According to embodiments of the display apparatus, as described above, the display quality of the display panel may be enhanced and the power consumption may be reduced.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display apparatus comprising:
- a display panel comprising a pixel;
- a gate driver which provides a gate signal to the pixel;
- a data driver which provides a data voltage to the pixel; and
- an emission driver which provides an emission signal to the pixel,
- wherein the pixel comprises:
  - a light emitting element;
  - a driving switching element which applies a driving current to the light emitting element;
  - a storage capacitor connected to a control electrode of the driving switching element; and
  - a bias capacitor including a first electrode connected to the storage capacitor and a second electrode which receives a bias gate signal, and
  - wherein a waveform of the bias gate signal varies based on an off ratio representing a ratio of an off period of the emission signal in a frame period.

2. The display apparatus of claim 1, wherein, as the off ratio increases, an amplitude of a pulse of the bias gate signal decreases.

3. The display apparatus of claim 1, wherein when the off ratio is greater than a first reference value, the bias gate signal maintains a high level without having a pulse.

4. The display apparatus of claim 1, wherein the storage capacitor includes a first electrode connected to the control electrode of the driving switching element and a second electrode connected to the first electrode of the bias capacitor.

5. The display apparatus of claim 1, wherein the first electrode of the bias capacitor is connected to the control electrode of the driving switching element.

6. The display apparatus of claim 1, wherein the pixel further comprises:
- a data voltage applying switching element which applies the data voltage to the storage capacitor; and
- a first leakage compensation switching element connected between the storage capacitor and the data voltage applying switching element.

7. The display apparatus of claim 6, wherein the pixel further comprises a second leakage compensation switching element including an input electrode connected to the control electrode of the driving switching element and a control electrode connected to a control electrode of the first leakage compensation switching element.

8. The display apparatus of claim 7, wherein the driving switching element and the data voltage applying switching element are P-type transistors, and
- wherein the first leakage compensation switching element and the second leakage compensation switching element are N-type transistors.

9. The display apparatus of claim 7, wherein the pixel further comprises a data initialization switching element which is connected to an output electrode of the second leakage compensation switching element and applies an initialization voltage to the output electrode of the second leakage compensation switching element.

10. The display apparatus of claim 9, wherein the pixel further comprises a threshold voltage compensation switching element connected between an output electrode of the data initialization switching element and an output electrode of the driving switching element.

11. The display apparatus of claim 9, wherein the pixel further comprises a light emitting element initialization switching element connected to an anode electrode of the light emitting element, wherein a control signal applied to a control electrode of the data initialization switching element is an N-th initialization gate signal, wherein a control signal applied to a control electrode of the light emitting element initialization switching element is an (N+K)-th initialization gate signal, wherein N is a positive integer, and wherein K is a positive integer.

12. A method of driving a display apparatus, the method comprising:

providing a gate signal to a pixel of a display panel of the display apparatus;

providing a data voltage to the pixel; and providing an emission signal to the pixel, wherein the pixel comprises:

a light emitting element;

a driving switching element which applies a driving current to the light emitting element;

a storage capacitor connected to a control electrode of the driving switching element; and a bias capacitor including a first electrode connected to the storage capacitor and a second electrode which receives a bias gate signal, and wherein a waveform of the bias gate signal varies based on an off ratio representing a ratio of an off period of the emission signal in a frame period.

* * * * *